US011460585B2

(12) United States Patent
Sotak et al.

(10) Patent No.: US 11,460,585 B2
(45) Date of Patent: Oct. 4, 2022

(54) IMPLEMENTING SINGLE DIFFERENCES WITHIN A SOLUTION SEPARATION FRAMEWORK

(71) Applicant: Honeywell International Inc., Morris Plains, NJ (US)

(72) Inventors: Milos Sotak, Kosice-Saca (SK); Zdenek Kana, Dubnany (CZ); Radek Baranek, Litovel (CZ)

(73) Assignee: Honeywell International Inc., Charlotte, NC (US)

( * ) Notice: Subject to any disclaimer, the term of this patent is extended or adjusted under 35 U.S.C. 154(b) by 210 days.

(21) Appl. No.: 16/823,105

(22) Filed: Mar. 18, 2020

(65) Prior Publication Data

US 2021/0293970 A1   Sep. 23, 2021

(51) Int. Cl.
*G01S 19/20* (2010.01)
*G01S 19/39* (2010.01)
*G01S 19/47* (2010.01)

(52) U.S. Cl.
CPC ............ *G01S 19/20* (2013.01); *G01S 19/393* (2019.08); *G01S 19/47* (2013.01)

(58) Field of Classification Search
CPC ......... G01S 19/22; G01S 19/393; G01S 19/47
See application file for complete search history.

(56) References Cited

U.S. PATENT DOCUMENTS

| | | | |
|---|---|---|---|
| 6,166,683 A | | 12/2000 | Hwang |
| 6,664,923 B1 * | | 12/2003 | Ford .................. G01S 19/47 |
| | | | 342/357.65 |
| 7,219,013 B1 * | | 5/2007 | Young ................. G01C 21/165 |
| | | | 701/472 |
| 7,504,996 B2 | | 3/2009 | Martin |
| 8,378,890 B2 | | 2/2013 | Chopard et al. |
| 9,000,978 B2 | | 4/2015 | Riedinger et al. |

(Continued)

OTHER PUBLICATIONS

Tanil et al., "Sequential Integrity Monitoring for Kalman Filter Innovations-Based Detectors", Proceedings of the 31st International Technical Meeting of the Satellite Division of The Institute of Navigation (ION GNSS+ 2018), Sep. 2018, pp. 2440-2455.

(Continued)

*Primary Examiner* — Cassi J Galt
(74) *Attorney, Agent, or Firm* — Fogg & Powers LLC

(57) ABSTRACT

Systems and methods for implementing single differences within a solution separation framework are provided. In certain embodiments, a method includes processing pseudorange measurements to determine a full navigation solution by applying a single difference between the pseudorange measurements. The method additionally includes performing innovation sequence monitoring. Also, the method includes processing a subset of the pseudorange measurements to determine a set of navigation sub-solutions by applying a single difference between the pseudorange measurements, wherein a result of the innovation sequence monitoring is applied to the set of navigation sub-solutions; and providing faults detection and computing protection levels of quantities of navigation information based on a full navigation solution estimate, navigation sub-solution estimates, dependence among the full navigation solution and the set of navigation sub-solutions, and probabilities of missed detection and false alert.

15 Claims, 3 Drawing Sheets

(56) References Cited

U.S. PATENT DOCUMENTS

| | | |
|---|---|---|
| 9,291,714 B2 | 3/2016 | Vourc'h |
| 2009/0146873 A1 | 6/2009 | Vanderwerf |
| 2009/0150074 A1 | 6/2009 | Vanderwerf |
| 2011/0115669 A1 | 5/2011 | Milyutin et al. |
| 2013/0120187 A1 | 5/2013 | Dai et al. |
| 2015/0219766 A1 | 8/2015 | Weed et al. |

OTHER PUBLICATIONS

European Patent Office, "Extended European Search Report from EP Application No. 21161136.3", from Foreign Counterpart to U.S. Appl. No. 16/823,199, dated Aug. 3, 2021, pp. 1 through 9, Published: EP.

Liang et al. "GNSS Mullti-Frequency Multi-System Highly Robust Differential Positioning Based on an Autonomous Fault Detection and Exclusion Method", Special Section on Advanced Data Analytics For Large-Scale Complex Data Environments, Nov. 1, 2017, pp. 26842 through 26851, vol. 5, IEEE.

Offer et al. "Use of Inertial Integration to Enhance Availability for Shipboard Relative GPS (SRGPS)", ION GNSS 19th International Technical Meeting of the Satellite Division, Sep. 2006, pp. 726 through 737, Fort Worth, TX.

Brenner "Integrated GPS/Inertial Fault Detection Availability", Navigation: Journal of The Institute of Navigation, Summer 1996, pp. 111 through 130, vol. 43, No. 2.

European Patent Office, "Extended European Search Report from EP 21161135.5", from Foreign Counterpart to U.S. Appl. No. 16/823,105, dated Aug. 24, 2021, pp. 1 through 10, Published: EP.

Feng et al. "Integrity Monitoring for Precise Point Positioning", Proceedings of the 27th International Technical Meeting of the ION Satellite Division, ION GNSS+ 2014, Sep. 2014, pp. 986 through 1007, Imperial College London.

U.S. Patent and Trademark Office, "Restriction Requirement", U.S. Appl. No. 16/823,199, dated Mar. 17, 2022, pp. 1 through 6, Published: US.

U.S. Patent and Trademark Office, "Office Action", U.S. Appl. No. 16/823,199, dated Jul. 19, 2022, pp. 1 through 37, Published: US.

\* cited by examiner

IMPLEMENTING SINGLE DIFFERENCES WITHIN A SOLUTION SEPARATION FRAMEWORK

BACKGROUND

Vehicles (and sometimes objects) frequently have navigation systems that acquire information about the movement, position, and orientation of the vehicle. The navigation systems use the acquired information to calculate navigation data from the acquired information. To acquire the information used to calculate the navigation data, some navigation systems may include a sensor set having an inertial measurement unit (IMU) and/or a GNSS antenna/receiver that provide measurements related to vehicle movement and vehicle position. Additionally, a navigation system may process the measurements using a Kalman or other statistical filter to estimate the position, velocity, and angular orientation of the vehicle relative to defined reference frames and apply corrections to the measurements provided by the sensors.

Additionally, some navigation systems are used in safety-critical navigation applications. In safety-critical navigation applications, it is important to ensure that the sensors are providing reliable measurements. Accordingly, the measurements and other output provided by the sensors may be continuously monitored to gauge the health of the sensors and the integrity of measurements provided by the sensors in the navigation system.

Frequently, monitoring the health and integrity of the sensors within the navigation system is achieved by exploiting the redundancy in the sensor measurements provided by the various sensors, and by using probabilistic algorithms to detect faults and estimate kinematic errors during fault free operations. One example of a method used to monitor the integrity of measurements used by a navigation system is a solution separation method.

SUMMARY

Systems and methods for implementing single differences within a solution separation framework are provided. In certain embodiments, a method includes processing pseudorange measurements to determine a full navigation solution by applying a single difference between the pseudorange measurements. The method additionally includes performing innovation sequence monitoring. Also, the method includes processing a subset of the pseudorange measurements to determine a set of navigation sub-solutions by applying a single difference between the pseudorange measurements, wherein a result of the innovation sequence monitoring is applied to the set of navigation sub-solutions; and providing faults detection and computing protection levels of quantities of navigation information based on a full navigation solution estimate, navigation sub-solution estimates, dependence among the full navigation solution and the set of navigation sub-solutions, and probabilities of missed detection and false alert.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Systems and methods for implementing single differences within a solution separation framework are described herein. In particular, using measurements acquired from different sources, a solution separation method may be performed on a single difference between the different measurements. For example, a main solution may be calculated using single differences of the available measurements. Additionally, sub-solutions and sub-sub solutions may be calculated using the single differences. Further, a processing unit may perform innovation sequence monitoring on the main solution, sub-solution, and sub-sub solutions. Using the applied innovation sequence monitoring, the system may identify faulty measurements. The faulty measurements may then be excluded from a subsequently processed solutions in the executed solution separation algorithm. For example, a processing unit may perform innovation sequence monitoring on the main filter and exclude the faulty measurements from subsequently processed sub-filters and sub-sub-filters when executing a solution separation algorithm. By calculating single differences and performing innovation sequence monitoring on the single differences to identify faulty measurements, a processing unit may remove the effects of some errors that affect the received measurements.

Figure 1:
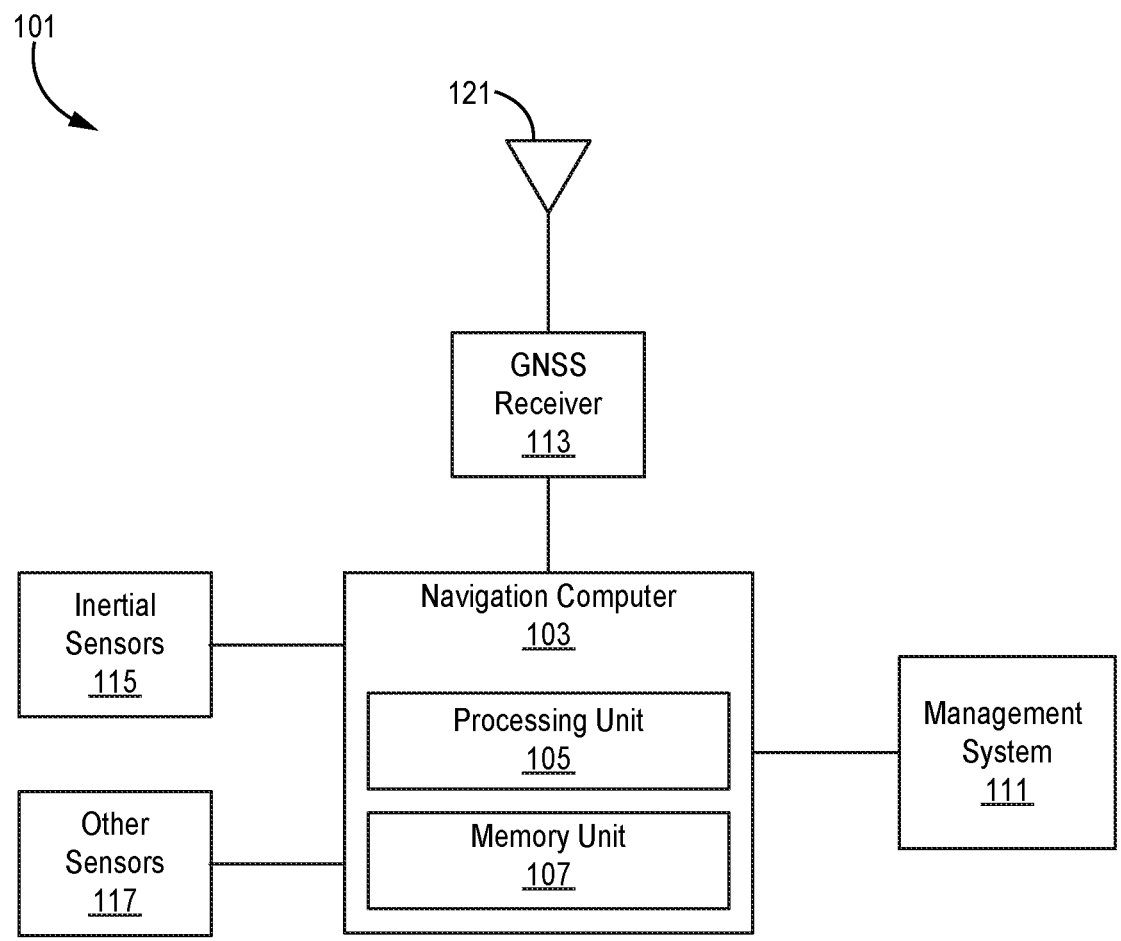
FIG. 1 is a block diagram illustrating an exemplary navigation system according to an aspect of the present disclosure.

FIG. 1 is a block diagram of a navigation system 101 that is capable of implementing single differences within a solution separation framework. The navigation system 101 may be mounted to a vehicle, such as an aircraft, sea craft, spacecraft, automobile, or other type of vehicle. Alternatively, the navigation system 101 may be located on or as part of a movable object, such as a phone, personal electronics, land surveying equipment, or other object that is capable of being moved from one location to another. Additionally, the navigation system 101 may acquire navigation information from one or more different sources. To handle the acquired navigation information, the navigation system 101 may include a navigation computer 103. The navigation computer 103 may further include at least one processing unit 105 and at least one memory unit 107.

In certain embodiments, the navigation system 101 may acquire navigation information that includes inertial motion information. To acquire the inertial motion information, the navigation system 101 may include inertial sensors 115 that measure and sense the inertial motion of the object mounted to the navigation system 101. For example, the navigation system 101 may be an inertial navigation system (INS) that receives raw inertial data from a combination of inertial sensors 115, such as gyroscopes and accelerometers. Alternatively, the inertial sensors 115 may be an INS that provides processed inertial navigation data acquired from inertial measurements to the navigation computer 103.

In further embodiments, the navigation system 101 may include a number of additional sensors that can provide navigation data. For example, the navigation system 101 may include one or more other sensors 117. For example, the one or more other sensors 117 may include a vertical position sensor such as an altimeter. Also, the one or more other sensors 117 may include electro-optical sensors, magnetometers, barometric sensors, velocimeters, and/or other types of sensors.

In certain embodiments, the navigation system 101 may use GNSS measurements to determine navigation information, the navigation system 101 may include a GNSS receiver 113 with at least one antenna 121 that receives satellite signals from multiple GNSS satellites that are observable to the at least one antenna 121. For example, during operation, the GNSS receiver 113 may receive GNSS satellite signals from the presently observable GNSS satellites. As used herein, the GNSS satellites may be any combination of satellites that provide navigation signals. For example, the GNSS satellites may be part of the global positioning system (GPS), GLONASS, Galileo system, COMPASS (BeiDou), or other system of satellites that form part of a GNSS. The GNSS satellites may provide location information anywhere on the Earth. The processing unit 105 and GNSS receiver 113 may receive the satellite signals and extract position, velocity and time data from the signals to acquire pseudorange measurements.

The processing unit 105 and/or other computational devices used in the navigation system 101, management system 111, or other systems and methods described herein may be implemented using software, firmware, hardware, or appropriate combination thereof. The processing unit 105 and other computational devices may be supplemented by, or incorporated in, specially-designed application-specific integrated circuits (ASICs) or field programmable gate arrays (FPGAs). In some implementations, the processing unit 105 and/or other computational devices may communicate through an additional transceiver with other computing devices outside of the navigation system 101, such as those associated with the management system 111 or computing devices associated with other subsystems controlled by the management system 111. The processing unit 105 and other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor, such as the processing unit 105. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device. For instance, the memory unit 107 may be an example of a computer readable medium capable of storing computer readable instructions and/or data structures. Also, the memory unit 107 may store navigational information such as maps, terrain databases, magnetic field information, path data, and other navigation information.

Suitable computer readable storage media (such as the memory unit 107) may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

In certain embodiments, navigation measurements may be subject to various errors and faults. To account for faults that may exist in the measurements, the navigation computer 103 may monitor the integrity of the various measurements used while navigating. For example, the processing unit 105 may receive signals from the GNSS receiver 113 conveying measurements associated with the different GNSS satellites in communication with the GNSS receiver 113. The processing unit 105 may then monitor the integrity of the signals. As used herein, integrity is a measure of the level of trust that can be placed in the correctness of the information supplied for use by a navigation system 101. A system that performs integrity monitoring may monitor the integrity of the various measurements during the operation of the navigation system 101. To perform integrity monitoring, systems may implement integrity monitoring algorithms.

In certain embodiments, integrity monitoring algorithms are based on a solution separation methodology. In a solution separation methodology, a system (such as the navigation system 101) may determine a full solution and one or more sub-solutions, where the full solution is calculated based on information acquired from a set of information sources and the sub-solutions are calculated based on information acquired from subsets of the set of information sources. Using the full solution and the sub-solutions, a system may determine the integrity of the full solution. For example, using the full solution and the sub-solutions, the system may determine whether or not a measurement is faulty. Additionally, executed integrity monitoring algorithms may calculate sub-sub-solutions that are solutions based on subsets of the subsets of the information used for each sub-solution. The executed integrity monitoring algorithm may use the sub-sub-solutions to identify which measurement sources are faulty and then exclude the measurements produced by faulty sources from calculations of navigation information.

In some implementations, the solution separation methodology may be used to determine the integrity of solutions calculated using information acquired from GNSS navigation satellites. For example, the main position solution may incorporate a set of pseudoranges from available satellites that are integrated with inertial sensor measurements, where the sub-solutions are based on a subset of the pseudoranges from the available satellites and the sub-sub-solutions are based on subsets of the subsets of the pseudoranges. The system may then determine the protection limits for the main position solution based on differences or separations between the main position solution and the sub-solutions. Also, the system may exclude pseudoranges that are determined to be faulty. Additionally, the executed integrity monitoring algorithm may use full solution estimates, sub-solution estimates, dependence among the full solution and set of sub-solutions, probabilities of missed detection, and probabilities of false alert to detect faults and compute protection levels.

In frequent embodiments, the navigation computer 103 may use statistical filtering (such as Kalman filtering or other filtering technique) to combine measurements acquired through the GNSS receiver 113 with measurements acquired from the inertial sensors 115 and the other sensors 117. When the navigation computer 103 uses a Kalman filter to combine measurements, the navigation computer 103 may use a dynamic model, control inputs of the navigation system 101, and multiple sequential measurements acquired from the inertial sensors 115, the other sensors 117, and through the GNSS receiver 113 to form an estimate of navigation parameters for the navigation system 101 that is better than measurements acquired from any one of the individual measurement sources.

When implementing a Kalman filter, the navigation computer 103 (or other computing system in communication with the navigation computer 103) may perform a prediction step and an update step. In the prediction step, the navigation computer 103 may predict a state estimate and an estimate covariance of a navigation solution for the navigation system 101. In the update step, the navigation computer 103 may create weighted measurements by applying a Kalman gain to measurements acquired from the measurement sources and add the weighted measurements to the predicted state estimate calculated in the prediction step. Further, when performing the update step, the navigation computer 103 may calculate an innovation (also known as a residual). To calculate the innovation, the navigation computer 103 may compare the observed measurements against the predicted state estimates. While the calculation by the navigation computer 103 have been described as applying to Kalman filtering it may also apply to Extended Kalman filter (EKF) Unscented Kalman filter, and other statistical filters. An EKF is typically applied when integrating INS and GNSS.

Frequently, hybrid systems that combine measurements like GNSS and INS measurements (like the navigation computer 103) may perform innovation sequence monitoring. As described herein, innovation sequence monitoring may refer to the application of statistical tests on the calculated innovations or measurement residuals. For example, the navigation computer 103 may calculate the innovations and perform a chi-square, Gaussian, or other statistical test on the innovations. The navigation computer 103 may use the results from the innovation sequence monitoring to identify faulty or erroneous measurements and exclude those measurements from subsequent processing. However, when performing the innovation sequence monitoring with GNSS measurements, the confidence in the residual test may be very poor due to the time prediction of GNSS receiver clocks. For example when performing sequential measurement processing, a GPS receiver clock bias may be estimated based on a first process measurement. If that first processed measurement is faulty or erroneous, the receiver clock bias estimate may cause the resultant navigation solution to also be faulty or erroneous.

In certain embodiments, the navigation computer 103 may remove the effects of GNSS receiver clock errors and/or other measurement common sources of errors by calculating a single difference and using the results of the single difference within a solution separation framework. As used herein, a single difference may refer to a difference between different measurements associated with different measurement sources. For example, the navigation computer 103 may calculate a single difference by calculating the differences between a measurement provided by a first measurement source and the measurements provided by the other measurement sources.

In some embodiments, the navigation computer 103 may calculate a single difference by calculating pseudorange measurement differences and using the results of the calculated pseudorange measurement differences within a solution separation framework. As used herein, a pseudorange measurement difference may refer to a single difference where the measurements are different pseudoranges associated with different satellites. For example, the navigation computer 103 may calculate a difference between a first pseudorange associated with a first satellite and a second pseudorange associated with a second satellite. The navigation computer 103 may calculate additional differences between the first pseudorange and a third pseudorange associated with a third satellite, additional differences between the first pseudorange and a fourth pseudorange associate with a fourth satellite, and so forth for the number of pseudorange measurements associated with different satellites.

In certain embodiments, the navigation computer 103 may calculate the pseudorange measurement difference within the solution separation method by implementing a statistical filter for one or more of a main solution, a sub-solution, or a sub-sub solution. For example, when calculating a solution in the solution separation method, the navigation computer 103 may calculate the differences between a first pseudorange and each of the other available pseudoranges. The navigation computer 103 may then calculate predicted states of the pseudorange measurement differences and calculate updates for the pseudorange measurement differences. As part of calculating the updates, the navigation computer 103 may perform innovation sequence monitoring on the pseudorange measurement differences by comparing the predicted states and the observed measurements.

As part of the innovation sequence monitoring, the navigation computer 103 may perform a statistical test to determine if the calculated innovations for any of the pseudorange measurement differences are indicative of errors or faults in the measurements acquired from the various GNSS satellites. For example, the navigation computer 103 may perform a chi-square test, a Gaussian test, comparison of the innovation to a threshold value, or other test on the innovations of the pseudorange measurement differences. If an innovation fails or part of the test fails, the navigation computer 103 may deploy logic to find the faulty pseudorange measurement. When the faulty pseudorange measurement is identified, the navigation computer 103 may exclude the faulty pseudorange measurement from the present and subsequent calculations.

In certain embodiments, the navigation computer 103 may then proceed to performing the standard solution separation method using the pseudorange measurement differences associated with the pseudoranges that passed the statistical test. For example, if the navigation computer 103 determines that a pseudorange associated with the third of six satellites is faulty, the navigation computer 103 may then perform the solution separation method excluding the faulty pseudorange.

Figure 2:
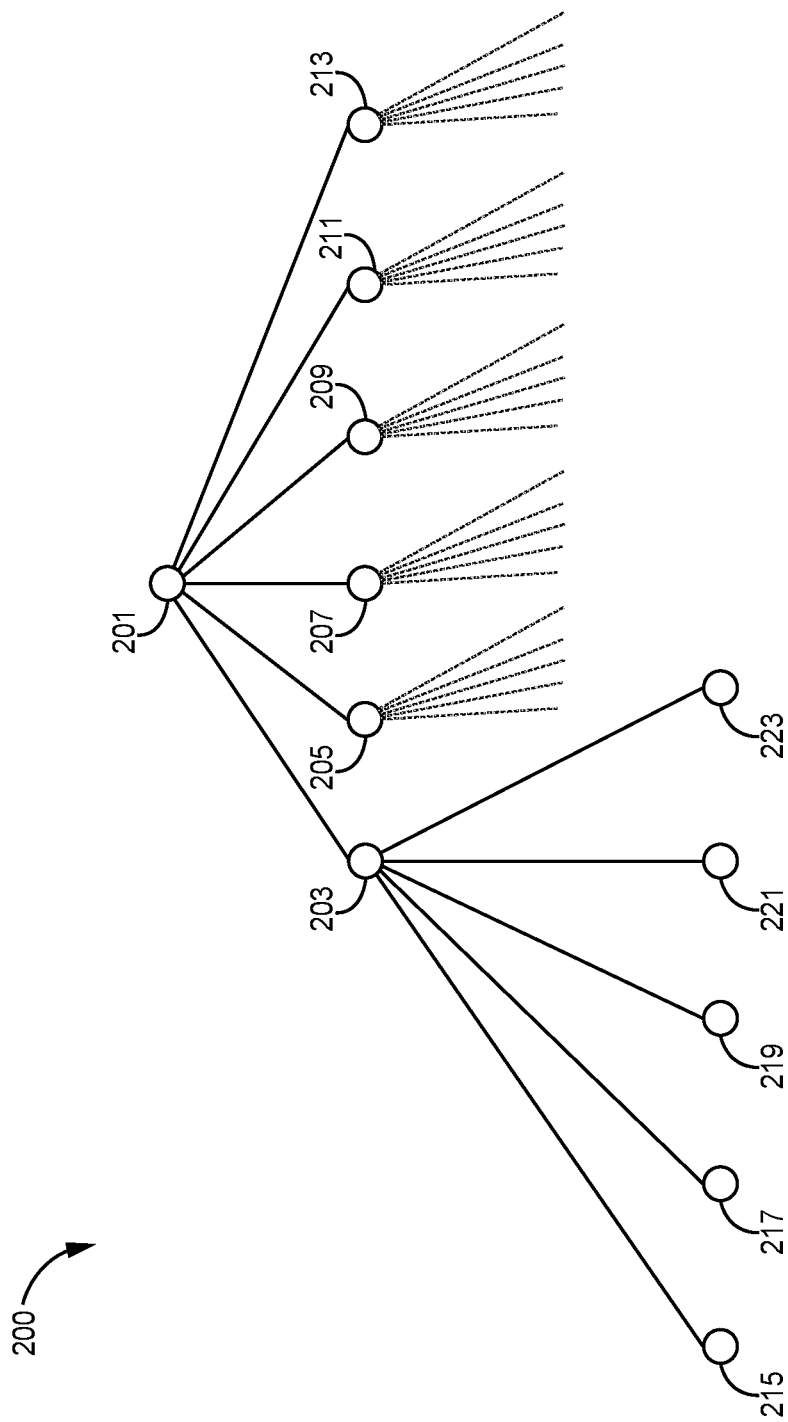
FIG. 2 is a block diagram illustrating the implementation of single differences within a solution separation framework according to an aspect of the present disclosure.

FIG. 2 is a diagram illustrating the use of a single differences (such as pseudorange measurement differences) within a solution separation method 200. As shown, the navigation computer 103 may perform the solution separation method 200 with a main solution 201, sub-solutions 203, 205, 207, 209, 211, and 213, and sub-sub-solutions 215, 217, 219, 221, and 223. However, as compared to a normal solution separation method that uses measurements, the solution separation method 200 uses single differences for the different solutions.

In certain embodiments, the navigation computer 103 calculates the main solution 201 by finding a set of differences between a first measurement and each of the other measurements. For example, when the measurements are pseudorange measurements associated with particular satellites (and for illustrative purposes six satellites), the navigation computer 103 may calculate a set of pseudorange differences, where each pseudorange difference in the set of pseudorange differences is respectively the difference between the pseudoranges of the first satellite and the second satellite, the first satellite and the third satellite, the first satellite and the fourth satellite, the first satellite and the fifth satellite, the first satellite, and the sixth satellite. Using the multiple computed differences, the system may calculate the main solution.

In further embodiments, when calculating the sub-solutions 203, 205, 207, 209, 211, and 213 the navigation computer 103 may identify a sub-set of measurements where one of the available measurements is excluded. From the identified sub-set of measurements, the navigation computer 103 may find a set of differences between a measurement in the sub-set and the remaining measurements in the sub-set. Using the set of differences, the navigation computer 103 may calculate a sub-solution. For example, for the sub-solution 203, the navigation computer 103 may identify the sub-set of measurements by excluding the measurement produced by a first of six satellites. Accordingly, the sub-solution 203 may be calculated using the set of differences that includes the pseudorange differences between a second satellite and a third satellite, the second satellite and a fourth satellite, the second satellite and a fifth satellite, and the second satellite and a sixth satellite. In a similar manner, the navigation computer 103 may calculate each of the sub-solutions 205, 207, 209, 211, and 213 by excluding a pseudorange measurement associated with a different satellite from each calculated sub-solution.

In additional embodiments, when calculating sub-sub-solutions, (sub-sub-solutions 215, 217, 219, 221, and 223, for example), the navigation computer 103 may identify sub-sub-sets of measurements. Each sub-sub-set may include a sub-set of the measurements associated with each sub-set of measurements, where each sub-sub-set is associated with a different excluded measurement from the associated sub-set of measurements. For example, for the sub-solution 203, the navigation computer 103 may calculate sub-sub-solutions 215, 217, 219, 221, and 223. Each of the sub-sub-solutions may exclude a different pseudorange measurement when calculating the differences between the different pseudorange measurements. For example, the sub-sub-solution 215 may calculate the sub-sub-solution using the differences in pseudorange measurements associated with the third satellite and the fourth satellite, the third satellite and the fifth satellite, and the third satellite and the sixth satellite; excluding the pseudorange measurements associated with the first and second satellite. In a similar manner, the navigation computer 103 may calculate each of the sub-sub-solutions 217, 219, 221, and 223 by excluding a pseudorange measurement associated with two different satellites from each calculated sub-sub-solution.

In certain implementations, when calculating the various solutions, sub-solutions, and sub-sub-solutions, the navigation computer 103 or other processing device may perform innovation testing on some or all of the solutions, sub-solutions, and sub-sub-solutions, where the innovation testing is performed substantially as described above in connection with FIG. 1. For example, the navigation computer 103 may perform innovation testing on the solution 201 and apply the results of the innovation test when calculating the sub-solutions and sub-sub-solutions. Alternatively, the navigation computer 103 may perform innovation testing on each of the sub-solutions and the sub-sub-solutions. Through the innovation testing, the navigation computer 103 may identify faulty measurements from calculations of solutions, sub-solutions, and sub-sub-solutions.

When calculating the single differences between measurements for the solutions, sub-solutions, and sub-sub-solutions, the navigation computer 103 may alter the calculation of measurements when performing filtering (i.e. Kalman filtering) of the measurements. For example, a general measurement may be represented as follows:

$z_k = Hx_k + v_k$, where $v_k \sim (0, R)$.

As shown, $z_k$ may refer to an observed measurement, $x_k$ may refer to a true state of the measurement, H may be an observation model that maps the true state of the measurement into the observed measurement, and $v_k$ may refer to observation noise.

To create a single difference for a GNSS pseudorange, the navigation computer 103 may define a transformation matrix C as follows:

$$C = \begin{bmatrix} 1 & -1 & 0 & 0 & 0 & 0 \\ 1 & 0 & -1 & 0 & 0 & 0 \\ 1 & 0 & 0 & -1 & 0 & 0 \\ 1 & 0 & 0 & 0 & -1 & 0 \\ 1 & 0 & 0 & 0 & 0 & -1 \end{bmatrix}.$$

The navigation computer 103 may apply the transformation matrix to the measurement as follows:

$-Cz_k = CHx_k + Cv_k$, where $v_k \sim (0, CRC^T)$.

Additionally, the navigation computer 103 may decorrelate $Cz_k$, CH, and $CRC^T$ using the following:

$[V, D] = \text{eig}(CRC^T)$.

For example, the navigation computer 103 may decorrelate $Cz_k$ as $V^T Cz_k$, CH using $H = V^T CH$, and $CRC^T$ using $R = V^T CRC^T V$. The navigation computer 103 may perform the decorrelation for the solution, sub-solutions, and sub-sub-solutions.

Methods described herein may be applicable for measurements with common error source which cannot be predicted with sufficient quality, e.g. the GNSS receiver clock error in GNSS measurements. In certain embodiments, by using the single differences, the navigation computer 103 may remove the effects of receiver clock errors. The removal of the effects of receiver clock errors allows effectiveness for the performance of innovation sequence monitoring by the navigation computer 103 and the isolation of erroneous or faulty measurements regardless of how many measurements are simultaneously affected by an error.

Figure 3:
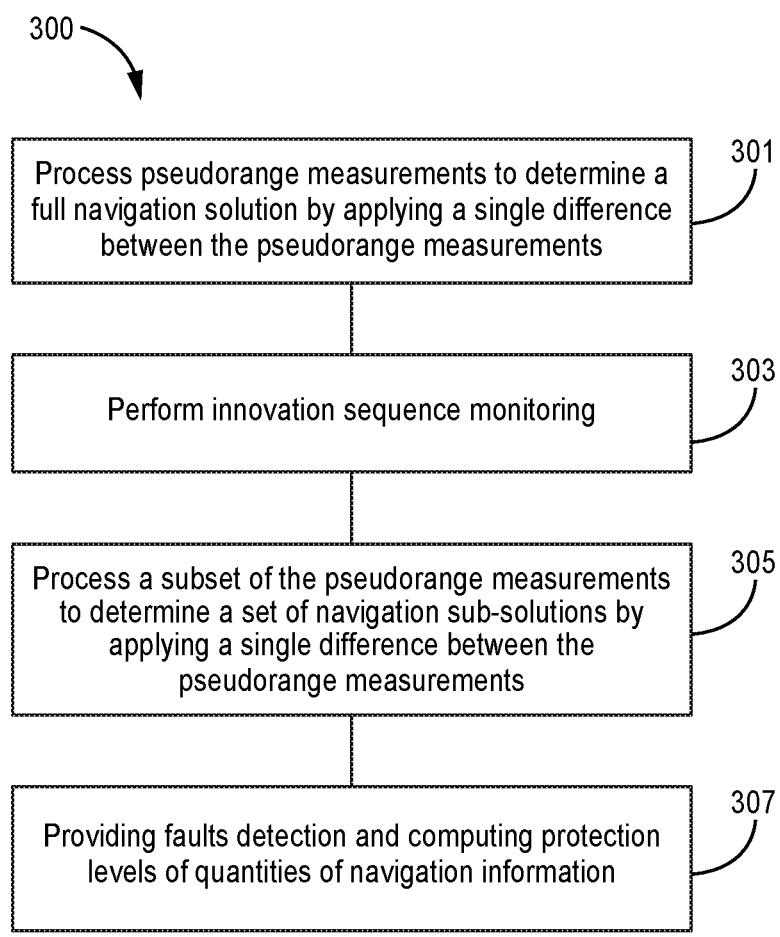
FIG. 3 is a flowchart diagram illustrating an exemplary method for implementing single differences within a solution separation framework according to an aspect of the present disclosure.

FIG. 3 is a flowchart diagram illustrating an exemplary method 300 for implementing single differences within a solution separation framework. The method 300 proceeds at 301, where pseudorange measurements are processed to determine a full navigation solution by applying a single difference between the pseudorange measurements. Additionally, the method 300 proceeds at 303, where innovation sequence monitoring is performed. Further, the method 300 proceeds at 305, where a subset of the pseudorange measurements are processed to determine a set of navigation sub-solutions by applying a single difference between the pseudorange measurements. Also, the method 300 proceeds at 307, where faults detection are provided and protection levels of quantities of navigation information are computed. For example, the providing of faults detection and computation of protection levels may be based on a full navigation solution estimate, navigation sub-solution estimates, dependence among the full navigation solution and the set of navigation sub-solutions, and probabilities of missed detection and false alert.

Example Embodiments

Example 1 includes a method comprising: processing pseudorange measurements to determine a full navigation solution by applying a single difference between the pseudorange measurements; performing innovation sequence monitoring; processing a subset of the pseudorange measurements to determine a set of navigation sub-solutions by applying a single difference between the pseudorange measurements, wherein a result of the innovation sequence monitoring is applied to the set of navigation sub-solutions; and providing faults detection and computing protection levels of quantities of navigation information based on a full navigation solution estimate, navigation sub-solution estimates, dependence among the full navigation solution and the set of navigation sub-solutions, and probabilities of missed detection and false alert.

Example 2 includes the method of Example 1, wherein performing innovation sequence monitoring comprises excluding a pseudorange measurement that fails one or more associated single difference statistical tests.

Example 3 includes the method of Example 2, wherein the statistical test is at least one of: a Chi-squared; and a Gaussian test.

Example 4 includes the method of any of Examples 1-3, wherein processing the subset of pseudorange measurements comprises: excluding a pseudorange measurement used to determine the full-navigation solution to form the subset; applying the single difference between the pseudorange measurements in the subset; and processing additional subsets of pseudoranges measurements for each remaining combination of pseudorange measurements having one excluded pseudorange measurement.

Example 5 includes the method of Example 4, further comprising: processing a sub-subset of the all measurements, further comprising: excluding an additional pseudorange measurement from the subset to form the sub-subset; and applying the single difference between the pseudorange measurements in the sub-subset; and processing additional sub-subsets of all measurements for each remaining combination of pseudorange measurements in the subset having two excluded pseudorange measurements.

Example 6 includes the method of Example 5, further comprising excluding pseudorange measurements based on results of processing the sub-subset and the additional sub-subsets for the subset and additional subsets.

Example 7 includes the method of any of Examples 1-6, wherein performing innovation sequence monitoring comprises calculating a residual using a statistical filter.

Example 8 includes the method of Example 7, wherein the statistical filter is at least one of: a Kalman filter; an extended Kalman filter; and an Unscented Kalman filter.

Example 9 includes a navigation system comprising: at least one receiver configured to receive a plurality of signals transmitted from a plurality of transmitters; and a processing unit operatively coupled to the navigation system, the processor configured to identify a plurality of measurements associated with the plurality of transmitters, wherein executable instructions cause the processing unit to: process the plurality of measurements to determine a full solution by applying a single difference between the plurality of measurements; perform innovation sequence monitoring; process a subset of the plurality of measurements to determine a set of sub-solutions by applying a single difference between the subset of the plurality of measurements, wherein a result of the innovation sequence monitoring is applied to the set of sub-solutions; and provide faults detection and compute protection levels of quantities of information based on a full solution estimate, sub-solutions estimates, dependence among the full solution and the set of sub-solutions, and probabilities of missed detection and false alert.

Example 10 includes the system of Example 9, wherein the executable instructions further cause the processing unit to determine whether a measurement from the plurality of measurements is used to determine the full solution and the set of sub-solutions when single difference measurement statistical tests related to the measurement are passed.

Example 11 includes the system of any of Examples 9-10, wherein the statistical test is a Chi-squared or Gaussian test.

Example 12 includes the system of any of Examples 9-11, wherein the processing a subset of the plurality of measurements comprises: excluding a measurement in the plurality of measurements used to determine the full-solution to form the subset; applying the single difference between measurements in the subset; and processing additional subsets of the plurality of measurements for each remaining combination of measurements having one excluded measurement.

Example 13 includes the system of Example 12, wherein the executable instructions further cause the processing unit to: exclude an additional measurement from the subset to form a sub-subset of measurements; and apply the single difference between the sub-subset of measurements; and process additional sub-subsets of measurements for each remaining combination of measurements in the subset having two excluded measurements.

Example 14 includes the system of Example 13, wherein the executable instructions further cause the processing unit to exclude measurements in the set of measurements based on the sub-subset of measurements and the additional sub-subsets of measurements.

Example 15 includes the system of any of Examples 9-14, wherein the processing unit performs the innovation sequence monitoring using a statistical filter.

Example 16 includes the system of Example 15, wherein the statistical filter is at least one of: a Kalman filter; an Extended Kalman filter; and an Unscented Kalman filter.

Example 17 includes the system of any of Examples 9-16, wherein a measurement in the plurality of measurements is a pseudorange measurement.

Example 18 includes a navigation system comprising: at least one global navigation satellite system (GNSS) receiver configured to receive a plurality of signals transmitted from a plurality of GNSS satellites; and a processing unit operatively coupled to the navigation system, the processor configured to identify a plurality of pseudorange measurements associated with the plurality of GNSS satellites, wherein executable instructions cause the processing unit to: process the plurality of pseudorange measurements to determine a full solution by applying a single difference between the plurality of measurements; process a subset of the plurality of measurements to determine a set of sub-solutions by applying a single difference between the subset of the plurality of measurements; perform innovation sequence monitoring on one or more of the full solution and the set of sub-solutions; and apply a result of the innovation sequence monitoring the full solution and the set of sub-solutions.

Example 19 includes the navigation system of Example 18, wherein innovation sequence monitoring comprises excluding a pseudorange measurement that fails one or more associated single difference statistical tests.

Example 20 includes the navigation system of any of Examples 18-19, wherein the executable instructions that direct the processing unit to process the subset of the plurality of measurements further direct the processing unit to: exclude a pseudorange measurement used to determine the full-navigation solution to form the subset; apply the single difference between the pseudorange measurements in the subset; and process additional subsets of pseudoranges measurements for each remaining combination of pseudorange measurements having one excluded pseudorange measurement.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
    receiving global navigation satellite system signals through a receiver to produce pseudorange measurements;
    processing the pseudorange measurements to determine a full navigation solution for a vehicle by calculating a set of single differences between the pseudorange measurements;
    performing innovation sequence monitoring, wherein performing the innovation sequence monitoring comprises identifying the pseudorange measurements that fail one or more associated single difference statistical tests;
    determining if the full navigation solution is faulty by processing subsets of the pseudorange measurements to determine a set of navigation sub-solutions by calculating subsets of single differences between subset pseudorange measurements for each subset of the pseudorange measurements that pass the one or more associated single difference statistical tests performed as part of the innovation sequence monitoring;
    identifying which pseudorange measurements are faulty by processing sub-subsets of the pseudorange measurements to determine a set of navigation sub-sub-solutions by calculating sub-subsets of single differences between the sub-subset pseudorange measurements for each sub-subset of the pseudorange measurements that pass the one or more associated single difference statistical tests; and
    excluding the pseudorange measurements identified as faulty from calculations of navigation solutions for the vehicle.

2. The method of claim 1, wherein the single difference statistical test is at least one of:
    a Chi-squared; and
    a Gaussian test.

3. The method of claim 1, wherein processing the subsets of the pseudorange measurements comprises:
    excluding a pseudorange measurement used to determine the full-navigation solution to form the subset;
    calculating the subset of single differences between the pseudorange measurements in the subsets; and
    processing additional subsets of pseudorange measurements for each remaining combination of the pseudorange measurements having one excluded pseudorange measurement.

4. The method of claim 3, wherein identifying which pseudorange measurements are faulty further comprises:
    excluding an additional pseudorange measurement from each of the subsets of the pseudorange measurements to form the sub-subset;
    applying the single difference between the pseudorange measurements in each sub-subset; and
    processing additional sub-subsets of all measurements for each remaining combination of the pseudorange measurements in the subset having two excluded pseudorange measurements.

5. The method of claim 1, wherein performing the innovation sequence monitoring comprises calculating a residual using a statistical filter, wherein a residual is a comparison of an observed measurement against a predicted measurement.

6. The method of claim 5, wherein the statistical filter is at least one of:
    a Kalman filter;
    an extended Kalman filter; and
    an Unscented Kalman filter.

7. A navigation system comprising:
    at least one receiver configured to receive a plurality of signals transmitted from a plurality of global navigation satellite systems (GNSS) satellites; and
    a processor operatively coupled to the at least one receiver, the processor configured to identify a plurality of pseudorange measurements associated with the plurality of GNSS satellites, wherein executable instructions cause the processing unit to:
        process the plurality of pseudorange measurements to determine a full solution by calculating a set of single differences between the plurality of pseudorange measurements;
        perform innovation sequence monitoring, wherein performing the innovation sequence monitoring comprises identifying pseudorange measurements that fails one or more associated single difference statistical tests;
        determine if the full solution is faulty by processing subsets of the plurality of pseudorange measurements to determine a set of sub-solutions by calculating the subsets of-a single differences between subset pseudorange measurements for each subset of the pseudorange measurements that pass the one or more associated single difference statistical tests as part of the innovation sequence monitoring; and
        identify which pseudorange measurements are faulty by processing sub-subsets of the pseudorange measurements to determine a set of sub-sub-solutions by calculating the sub-subsets of single differences between the sub-subset pseudorange measurements for each sub-subset of the pseudorange measurements that pass the one or more associated single difference statistical tests; and exclude the pseudorange measurements identified as faulty from calculations of navigation solutions.

8. The system of claim 7, wherein the single difference statistical test is a Chi-squared or Gaussian test.

9. The system of claim 7, wherein the executable instructions further cause the processing unit to:

exclude a pseudorange measurement in the plurality of pseudorange measurements used to determine the full-solution to form the subset;

calculate the subset of single differences between the pseudorange measurements in the subsets; and processing additional subsets of the plurality of measurements for each remaining combination of measurements having one excluded measurement.

10. The system of claim 9, wherein the executable instructions further cause the processing unit to:

exclude an additional pseudorange measurement from the subset of the pseudorange measurements to form a sub-subset of measurements;

apply the single difference between the sub-subset of the pseudorange measurements; and process additional sub-subsets of pseudorange measurements for each remaining combination of the pseudorange measurements in the subset having two excluded measurements.

11. The system of claim 7, wherein the processing unit performs the innovation sequence monitoring using a statistical filter.

12. The system of claim 11, wherein the statistical filter is at least one of:

a Kalman filter;

an Extended Kalman filter; and an Unscented Kalman filter.

13. A navigation system comprising:

at least one global navigation satellite system (GNSS) receiver configured to receive a plurality of signals transmitted from a plurality of GNSS satellites; and a processor operatively coupled to the at least one GNSS receiver, the processor configured to identify a plurality of pseudorange measurements from the plurality of signals, wherein executable instructions cause the processing unit to:

process the plurality of pseudorange measurements to determine a full solution by applying-a single differences between the plurality of measurements;

perform innovation sequence monitoring on the single differences between the plurality of measurements to identify passed measurements;

process a subset of the passed measurements to determine a set of sub-solutions by applying a single difference between the subset of the passed measurements;

process a sub-subset of the passed measurements to determine a set of sub-sub-solutions by applying the single difference between subsets of the subset of the passed measurements;

calculate a navigation solution based on the process of the subset and the sub-subset of the passed measurements.

14. The navigation system of claim 13, wherein innovation sequence monitoring comprises excluding a pseudorange measurement that fails one or more associated single difference statistical tests from the passed measurements.

15. The navigation system of claim 13, wherein the executable instructions that direct the processing unit to process the subset of the passed measurements further direct the processing unit to:

exclude a pseudorange measurement used to determine the full-navigation solution to form the subset;

calculate the subset of the single differences between the pseudorange measurements in the subset; and process additional subsets of pseudoranges measurements for each remaining combination of pseudorange measurements having one excluded pseudorange measurement.

* * * * *